United States Patent [19]
Yamaguchi et al.

[11] 3,915,798
[45] Oct. 28, 1975

[54] PROCESS FOR PRODUCING 7-AMINO DESACETOXY CEPHALOSPHORANIC ACID

[75] Inventors: Tsutomu Yamaguchi; Hiroshi Ishii, both of Shizuoka, Japan

[73] Assignee: Toyo Jozo Kabushiki Kaisha, Japan

[22] Filed: June 18, 1973

[21] Appl. No.: 370,619

[30] Foreign Application Priority Data
June 17, 1972 Japan.............................. 47-60593

[52] U.S. Cl..................................... 195/29; 195/30
[51] Int. Cl.$^2$.......................................... C12D 13/06
[58] Field of Search................... 195/29, 30, 36 R

[56] References Cited
UNITED STATES PATENTS
3,749,641   7/1973   Takahashi et al..................... 195/29
3,821,081   6/1974   Abe et al. ............................ 195/29

*Primary Examiner*—Alvin E. Tanenholtz
*Attorney, Agent, or Firm*—Young & Thompson

[57] ABSTRACT

7-Amino desacetoxy cephalosporanic acid represented by the general formula,

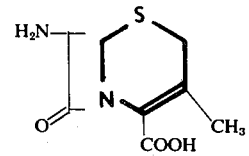

is produced according to a process in which a 7-acylamino desacetoxy cephalosporanic acid represented by the general formula,

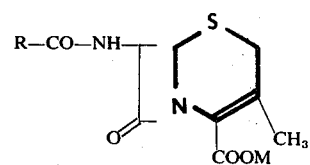

wherein R is a benzyl or phenoxymethyl group, and M is an alkali metal atom capable of forming a water-soluble salt, is treated with a culture filtrate or aqueous medium each containing deacylating enzyme of a microorganism *Arthrobacter simplex* ATCC 15799, *Kluyvera citrophila* ATCC 21285, *Proteus rettgeri* ATCC 9250 or *Micrococcus* sp. NRRL B-2753.

2 Claims, No Drawings

PROCESS FOR PRODUCING 7-AMINO DESACETOXY CEPHALOSPHORANIC ACID

This invention relates to a process for producing 7-amino desacetoxy cephalosporanic acid (herein after designates as 7-ADCA) by enzymatically deacylating a 7-acylamino desacetoxy cephalosporanic acid. More particularly, the present invention is concerned with a process for preparing 7-ADCA, i.e. 7-amino-3-methyl-$\Delta^3$-cephem-4-carboxylic acid, by use of an enzyme preparation derived from a strain of *Arthrobacter simplex* ATCC 15799, *Kluyvera citraphila* ATCC 21285, *Proteus rettgeri* ATCC 9250 or Micrococcus sp. NRRL B-2753.

Heretofore, 7-ADCA has been produced by several procedures including chemical decomposition processes and enzymatic splitting processes. There has not previously been proposed any process for producing 7-ADCA by using microorganism belonging to genus Arthrobacter, Kluyvera, Proteus or Micrococcus.

We had found that a strain of *Bacillus megaterium* produced the enzyme which cleave the 3-methyl-7-acylamido-$\Delta^3$-cephem-4-carboxylic acid to form 7-ADCA. The enzymatic process using this strain has, however, according to the conditions employed, the tendency to proceed reversely as acylating reaction. Accordingly, the possibility of enzymatically producing 7-ADCA was considered and various microorganisms capable of deacylating 3-methyl-7-acylamido-$\Delta^3$-cephem-4-carboxylic acid without reverse reaction were investigated. It has now been found that a strain *Arthrobacter simplex* ATCC 15799; *Kluyvera citrophila* ATCC 21285, *Proteus rettgeri* ATCC 9250 or Micrococcus sp. NRRL B-2753, which have been obtained from the permanent collection of ATCC and NRRL in U.S.A., produce an enzyme capable of decomposing the amide bonds of 3-methyl-7-phenoxyacetamido-$\Delta^3$-cephem-4-carboxylic acid and 3-methyl-7-phenylacetamido-$\Delta^3$-cephem-4-carboxylic acid. It has also been found that when 3-methyl-7-phenylacetamido-$\Delta^3$-cephem-4-carboxylic acid is treated with an enzyme preparation derived from the above-mentioned strains, there is produced the compound known as 7-ADCA.

The present invention provides a process for enzymatic production of an intermediate for preparing antibiotic cephalosporins which are useful as chemical therapeutic preparations.

According to the invention, there is provided a process for producing 7-amino desacetoxy cephalosporanic acid represented by the general formula,

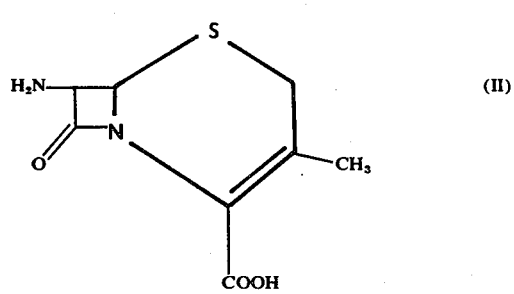

in which a salt of 7-acylamino desacetoxy cephalosporanic acid represented by the general formula,

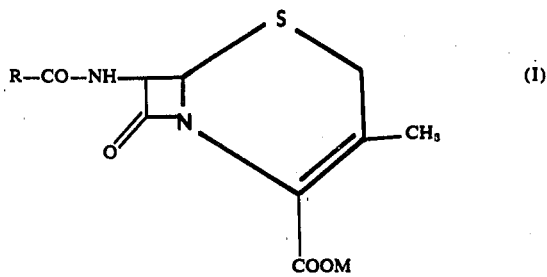

wherein R is a benzyl or phenoxymethyl group, and M is an alkali metal atom forming a water-soluble salt of the compound (I) [hereinafter designates as Ce(I)] is deacylated by treatment with a culture filtrate, cultured microbial cells or enzyme preparation of strain belonging to the genus microorganism hereinbefore which produce an enzyme which can cleave the amide bond of the said compound, said strain being *Arthrobacter simplex* ATCC 15799, *Kluyvera citrophila* ATCC 21285, *Proteus rettgeri* ATCC 9250 or Micrococcus sp. NRRL B-2753.

Advantageously, the enzyme is adsorbed on a carrier which does not inactivate said enzyme. The 7-amino desacetoxy cephalosporanic acid can then be recovered from the resulting reaction liquid. The use of an adsorbing carrier avoids the necessity for costly separation of the enzyme from the culture broth. The enzyme is present on the carrier as a solid phase. Thus the enzyme can be repeatedly used without being inactivated. The aqueous solution of the water soluble salt of 7-acylamino desacetoxy cephalosporanic acid can be passed through a column of said carrier, and 7-ADCA emerges in an extremely high yield and, moreover, the enzyme continuously deacylates the 7-acylamino desacetoxy cephalosporanic acid and thus can be used with high efficiency.

The enzyme which is used in the present process can be obtained by aerobically culturing *Arthrobacter simplex* ATCC 15799, *Kluyvera citrophila* ATCC 21285, *Proteus rettgeri* ATCC 9250 or Micrococcus sp. NRRL B-2753 at 28° to 35°C. for 18 to 72 hours in a medium which is ordinarily used for the cultivation of microorganism, e.g. a nutrient medium containing proper amounts of a nitrogen source such as peptone, meat extract, corn steep liquor, yeast extract, dry yeast, soybean protein hydrolysate or soybean lixiviate; a carbon source such as molasses, glucose or glycerin; and inorganic salts; and, in some cases, other growth-promoting materials. Generally, aeration is effected by stirring the culture liquid.

The above-mentioned enzyme is ordinarily an exo- or endo-enzyme and is present in a culture filtrate or cultured nicrobial cells. In the enzyme reaction, therefore, the enzyme is used in the form of a culture filtrate or cultured broth, or of an enzyme preparation prepared from the culture filtrate or microbial cells. The enzyme preparation is obtained by subjecting the enzyme to a conventional method. The enzyme solution obtained according to the conventional procedures may be subjected to reduced pressure concentration, freeze-drying or the like operation to obtain a solid product, or may be used as it is for the treatment of Ce(I). In case of endo-enzyme, cultured broth or microbial cells collected therefrom, suspension of microbial cells, freeze dried cells, acetone dried cells or the like may be used as the enzyme preparation for the enzyme reaction.

The enzyme reaction may be carrieid out by dissolving Ce(I) in water or a buffer solution and then treating the solution with the above-mentioned enzyme preparation. The Ce(I) is converted into a water-soluble sodium or potassium salt, and may be used at a concentration within the range from 0.1 to 2.0% W/V, preferably from about 0.5 to 1% W/V. The pH of the reaction liquid is preferably maintained within the range from about 7 to 8. The reaction temperature is from 20° to 45°C., preferably from about 30° to 37°C., whereby favorable results can be obtained. The reaction time varies depending on the reaction conditions, but is ordinarily from about 3 to 30 hours, and the reaction may be terminated when the yield of the 7-ADCA represented by the formula (II) becomes maximum.

The carrier used in the present process must be able to adsorb the deacylating enzyme without inactivating it; should not release the enzyme even when washed with water; it should have no detrimental influence on the Ce(I)-deacylating reation; and should not substantially adsorb the resulting 7-ADCA. For example, when an inorganic carrier such as diatomaceous earth ["Celite" (trade mark)], or an ion exchanger such as CM-Cellulose, or an ion-exchange resin such as "Amberlite" (trade mark) CG-50 is used as the carrier, the Ce(I)-deacylating enzyme produced by the microorganism hereinbefore is adsorbed well without being inactivated.

In adsorbing the Ce(I)-deacylating enzyme on the carrier, it is desirable that the pH of the cultured broth of Ce(I)-deacylating enzyme-producing strain is previously adjusted to the stable pH for the deacylating enzyme.

The adsorbtion of the deacylating enzyme on the carrier may be carried out batches or in a column. The amount of the carrier to be used varies depending on the amount and activity of enzyme and on the adsorbability of the deacylating enzyme on the carrier. In adsorbing the enzyme according to the batch-wise procedure, however, the amount of the carrier used may be about 5 to 15 W/V% based on the amount of the culture filtrate or 5 to 20 excess amount based on the amount of the cultured microbial cells, and a mixture of the culture filtrate and the carrier is stirred, and then the carrier is separated and washed with water. In the case of adsorption according to the columnwise procedure, a carrier packed in a column is wetted with water or with a buffer solution adjusted to the stable pH of the deacylating enzyme, the cultured broth or enzyme solution is passed through the column, and then the column is washed with water.

When the thus obtained solid preparation is dried, the deacylating enzyme tends to be inactivated. Accordingly, it is desirable that the preparation is kept in a wet state.

The Ce(I) used in the present invention may be prepared according to a known process. However, the inventive Ce(I)-deacylating reaction is carried out in aqueous solution so that the Ce(I) should be in the form of a water-soluble alkali metal salt, e.g. a sodium or potassium salt.

In the preffered process of the invention, an aqueous solution of Ce(I) is treated with the deacylating enzyme adsorbed on a carrier, and it is desirable that the solution should be buffered to the optimum deacylating enzyme. The above-mentioned enzyme reaction is preferably carried out on a column so that the reaction can be effected continuously. The concentration of Ce(I) solution varies according to the enzyme titer, [i.e. the Ce(I)-deacylating ability] of the deacylating enzyme and the flow rate, it being desirable that the amount of unreacted Ce(I) left in the emerging reaction liquid is small. Generally, the concentration of Ce(I) is 0.1 to 2.0% W/V, preferably about 0.5 to 1.0% W/V. The above-mentioned reaction is of course, effected at a suitable pH and temperature, and preferably at the optimum pH the temperature of the Ce(I)-deacylating enzyme. However, it is desirable that various reaction conditions are selected so that 7-ADCA is formed in as high a yield as possible. The reaction time may be varied by altering the flow rate. Generally, the reaction is complete before the aqueous Ce(I) solution has passed through the carrier layer in the column. However, when the activity is low and a large amount of Ce(I) has been left in the reaction liquid, the reaction liquid may be recycled.

If the process to be carried out continuously the aqueous Ce(I) solution is continuously added to the carrier. However, the Ce(I)-deacylating effect tends to gradually decrease day by day due to contamination by miscellaneous bacteria. This problem can be minimized by adding toluene to the top of the column or directly to the carrier.

In the present process, one carrier layer can be used for more than 10 days, so that 7-ADCA can be recovered in high yield and produced at low cost.

The recovery of 7-ADCA from the thus obtained reaction liquid may be carried out according to a known procedure.

The following Examples are given for the purpose of illustrating the present invention:

EXAMPLE 1.

500 ml. of liquid culture medium (pH 7.3) containing peptone 1%, yeast extract 0.5% and sodium chloride 0.25% were introduced into five 500 ml. flasks and sterilized for 20 minutes with superheated steam at 120°C. To this medium was inoculated a strain of *Arthrobacter simplex* ATCC 15799 and cultured at 30°C., for 48 hours with shaking reciprocally. After cutivation, the cells were collected to obtain microbial cells which were washed with 0.9% aqueous sodium chloride. The washed cells were suspended in 500 ml. of 0.2 mole phosphate buffer (pH 7.0) containing 0.1% of sodium 7-phenylacetamido desacetoxy cephalosporanic acid and incubated at 37°C., for 3 hours. The 7-ADCA formation ratio was assayed as 40%.

EXAMPLE 2.

Example 1 was repeated except that microorganism *Arthrobacter simplex* ATCC 15799 was replaced by *Kluyvera citrophila* ATCC 21285. The formation ratio of 7-ADCA in the reaction medium was assayed as 60%.

EXAMPLE 3.

A strain of Micrococcus sp. NRRL B-2753 was inoculated in the same medium as described in Example 1 and cultured at 30°C., for 24 hours with shaking reciprocally.

The cultured broth was adjusted to pH 7.5, added 7-phenylacetamido desacetoxy cephalosporanic acid solution therein and incubated at the same condition as described in Example 1. The formation ratio of 7-ADCA was assayed as 55%.

EXAMPLE 4.

100 ml. of liquid medium (pH 7.0) containing peptone 1%, meat extract 1% and sodium chloride 0.5% were introduced into a 500 ml. flask and sterilized at 120°C., for 20 minutes. To this medium was inoculated a strain of Proteus rettgeri ATCC 9250 and shake cultured at 30°C., for 24 hours.

20 l. of a liquid culture medium (pH 7.0) containing glucose 2%, peptone 1%, meat extract 1% and sodium chloride 0.5% was fed to a 30 liter jar fermentor, and sterilized for 20 minutes with superheated steam at 120°C. Thereafter seed culture liquor hereinbefore was transferred under sterile conditions to the aforesaid jar fermentor, and cultured at 30°C., for 48 hours with aeration and agitation. After the cultivation, the medium was inoculated into 500 liters of a liquid medium (pH 7.0) in a 1 ton-tank consisting of glucose 3%, corn steep liquor 1%, yeast extract 0.5%, dipotassium hydrogen phosphate 0.1%, magnesium sulphate 0.05% and sodium chloride 0.05%, and submerged cultured with aeration at 30°C., for 72 hours. After fermentation, to the culture filtrate was added 4 kg. of "Celite", and stirred for 30 minutes while maintaining the pH at 7. Subsequently, the mixture was centrifuged and the residue was washed with water to obtain 5.8 kg. of wet enzyme adsorbate. This adsorbate was packed in a poly vinyl chloride column of 120 × 1200 mm. in size, and a solution of 10 mg./ml. of 7-phenylacetamido desacetoxy cephalosporanic acid in a 0.1 mole phosphate buffer (pH 7.5) was passed through the column while maintaining the temperature at 37°C. (total amount 2 kg./400 liters, flow rate 5 liters/hr.). The elution was completed in 82 hours to obtain a total of 420 liters of eluate. To this eluate was added 300 liters of acetone, and the resulting mixture was adjusted to pH 4.0 by use of 6N-HCl, stirred for 30 minutes and then allowed to stand overnight to deposit a precipitate. The precipitate was recovered by filtration, washed with acetone and then dried to obtain 1255 g. of crystals of 7-ADCA (purity 93%), yield 90%.

What is claimed is:

1. A process for producing 7-amino desacetoxy cephalosporanic acid represented by the formula,

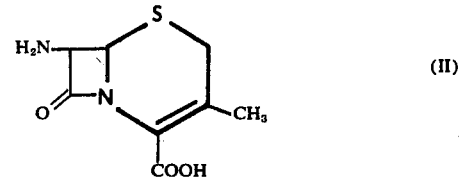

which comprises treating a 7-acylamino desacetoxy cephalosporanic acid represented by the formula,

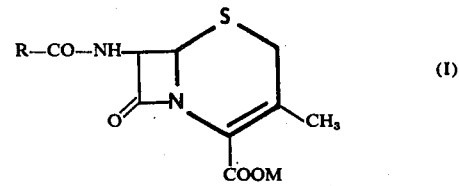

wherein R is a benzyl or phenyoxymethyl group, and M is an alkali metal atom capable of forming a water-soluble salt, with a culture filtrate or aqueous medium each containing deacylating enzyme of Proteus rettgeri ATCC 9250.

2. A process according to claim 1 in which 7-amino desacetoxy cephalosporanic acid is recovered from the resulting reaction liquid.

* * * * *